(12) United States Patent
Iguchi

(10) Patent No.: US 10,991,511 B2
(45) Date of Patent: *Apr. 27, 2021

(54) DIELECTRIC COMPOSITION AND ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,242

(22) Filed: Sep. 3, 2019

(65) Prior Publication Data

US 2020/0090868 A1 Mar. 19, 2020

(30) Foreign Application Priority Data

Sep. 13, 2018 (JP) .............................. JP2018-171685

(51) Int. Cl.

| C04B 35/495 | (2006.01) |
|---|---|
| H01G 4/12 | (2006.01) |
| H01G 4/30 | (2006.01) |
| C04B 35/626 | (2006.01) |
| C04B 35/634 | (2006.01) |
| C04B 35/64 | (2006.01) |
| H01G 4/012 | (2006.01) |

(52) U.S. Cl.
CPC .......... *H01G 4/1236* (2013.01); *C04B 35/495* (2013.01); *C04B 35/6262* (2013.01); *C04B 35/6264* (2013.01); *C04B 35/62645* (2013.01); *C04B 35/63416* (2013.01); *C04B 35/64* (2013.01); *H01G 4/012* (2013.01); *H01G 4/30* (2013.01); *C04B 2235/3215* (2013.01); *C04B 2235/3217* (2013.01); *C04B 2235/3222* (2013.01); *C04B 2235/3255* (2013.01); *C04B 2235/3262* (2013.01); *C04B 2235/3272* (2013.01); *C04B 2235/3281* (2013.01); *C04B 2235/3298* (2013.01); *C04B 2235/3418* (2013.01); *C04B 2235/604* (2013.01); *C04B 2235/6562* (2013.01); *C04B 2235/6567* (2013.01); *C04B 2235/77* (2013.01)

(58) Field of Classification Search
CPC ... C04B 35/495; H01G 4/1236; H01G 4/1254
See application file for complete search history.

(56) References Cited

U.S. PATENT DOCUMENTS

| 10,354,799 B2 * | 7/2019 | Nomura | H01G 4/30 |
| 10,513,464 B2 * | 12/2019 | Akiba | H01G 4/1254 |
| 2020/0090869 A1 * | 3/2020 | Iguchi | C04B 35/62685 |
| 2020/0303122 A1 * | 9/2020 | Iguchi | C04B 35/6262 |

FOREIGN PATENT DOCUMENTS

JP H03-274607 A 12/1991

* cited by examiner

*Primary Examiner* — Karl E Group
(74) *Attorney, Agent, or Firm* — Oliff PLC

(57) ABSTRACT

A dielectric composition including a complex oxide represented by a general formula of $A_aB_bC_4O_{15+\alpha}$ as a main component, in which "A" at least includes Ba, "B" at least includes Zr, "C" at least includes Nb, "a" is 3.05 or more, and "b" is 1.01 or more.

12 Claims, 1 Drawing Sheet

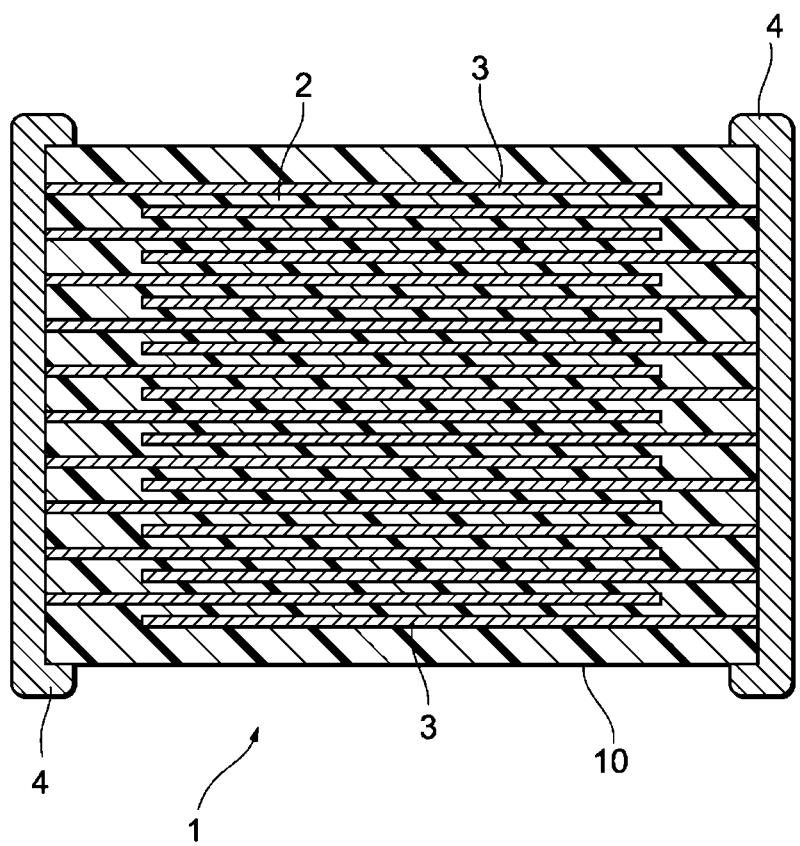

DIELECTRIC COMPOSITION AND ELECTRONIC COMPONENT

BACKGROUND OF THE INVENTION

The present invention relates to a dielectric composition and an electronic component having a dielectric layer constituted from the dielectric composition.

An electronic circuit and a power supply circuit which are incorporated to an electronic device are mounted with many electronic components such as a multilayer ceramic capacitor which uses a dielectric property of dielectrics. As a material constituting the dielectrics of such electronic component (dielectric material), a barium titanate based dielectric composition is widely used.

However, recently the electronic component has been used for many purposes, and for example it is demanded that the electronic component sufficiently functions even under high temperature or high voltage environment. However, under such environment, the dielectric property of the barium titanate based dielectric composition decreases; hence the barium titanate based dielectric composition cannot sufficiently correspond to the environment. Therefore, it is demanded that the dielectric composition can exhibit a high dielectric property even when used under such environment.

As a dielectric composition other than the barium titanate based dielectric composition, Patent Document 1 discloses a ferrodielectric material represented by a general formula of $Ba_6Ti_2Nb_8O_{30}$ in which part of Ba, Ti, and Nb are substituted by other elements.

Patent Document 1: JP Patent Application Publication No. H03-274607

SUMMARY OF THE INVENTION

As mentioned in above, many electronic components are mounted to an electronic device, thus low cost electronic components are demanded. In order to produce the low cost electronic components, base metals are used as a material of an electrode.

However, particularly in a multilayer electronic component having a constitution in which a dielectric layer and an internal electrode are stacked alternatingly, when the base metals are used as a material of the internal electrode, it is necessary to fire the dielectric layer and the internal electrode at the same time under reduced atmosphere in order to prevent oxidation of the base metals. When oxides (the dielectric composition) are fired under reduced atmosphere, oxygen is taken from the oxides, and oxygen defects and thus free electrons are easily generated. The free electrons generated cause a resistivity of the dielectric composition which is intrinsically an insulator to decrease. As a result, the dielectric composition becomes a semiconductor or a conductor. Therefore, the dielectric composition which is supposed to be an insulator having a decreased resistivity cannot exhibit the dielectric property. Therefore, the dielectric composition constituting the dielectric layer which is fired at the same time with the base metals needs to have a high resistivity even when it is fired under reduced atmosphere.

However, when the dielectric composition described in Patent Document 1 is fired under reduced atmosphere, a resistivity decreased significantly.

The present invention is attained in view of such circumstances, and the object is to provide a dielectric composition showing a high resistivity even when it is fired under reduced atmosphere, and to provide an electronic component having a dielectric layer constituted from the dielectric composition.

In order to attain the above object, the dielectric composition of the present invention is

[1] a dielectric composition including a complex oxide represented by a general formula of $A_aB_bC_4O_{15+\alpha}$ as a main component, in which "A" at least includes Ba, "B" at least includes Zr, "C" at least includes Nb, "a" is 3.05 or more, and "b" is 1.01 or more.

[2] The dielectric composition according to [1], wherein the general formula is represented by $(Ba_{1-x}A1_x)_a(Zr_{1-y}B1_{1-y})_b(Nb_{1-z}C1_z)_4O_{15+\alpha}$, in which "A1" includes one or more selected from the group consisting of Mg, Ca, and Sr, "B1" includes one or more selected from the group consisting of Ti and Hf, "C1" includes Ta, "x" is 0.50 or less, "y" is 0.25 or less, and "z" is 0.50 or less.

[3] The dielectric composition according to [1] or [2], wherein "a" is 3.10 or more.

[4] The dielectric composition according to any one of [1] to [3], wherein "b" is 1.05 or more.

[5] The dielectric composition according to any one of [1] to [4], wherein the dielectric composition includes an oxide including aluminum.

[6] The dielectric composition according to [5], wherein the oxide including aluminum (aluminum oxides) are a complex oxide including Ba.

[7] The dielectric composition according to any one of [1] to [6], wherein a density is 4.48 g/cm$^3$ or more.

[8] An electronic component comprising a dielectric layer including the dielectric composition according to any one of [1] to [7] and an electrode layer including a base metal as a main component.

According to the present invention, the dielectric composition showing a high resistivity even when it is fired under reduced atmosphere can be provided, and also the electronic component having the dielectric layer constituted from the dielectric composition can be provided.

BRIEF DESCRIPTION OF DRAWINGS

The FIGURE is a cross section of a multilayer ceramic capacitor according to an embodiment of the present invention.

DETAILED DESCRIPTION OF THE INVENTION

Hereinafter, the present invention is described in detail based on specific embodiment in the following order.
1. Multilayer Ceramic Capacitor
   1.1 Overall Constitution of Multilayer Ceramic Capacitor
   1.2 Dielectric Layer
   1.3 Internal Electrode Layer
   1.4 External Electrode
2. Dielectric Composition
   2.1 Complex oxide
   2.2 Oxides of Al (Aluminum oxides)
3. Method of Producing Multilayer Ceramic Capacitor
4. Effects in Present Embodiment
5. Modified Example

1. MULTILAYER CERAMIC CAPACITOR (1.1 Overall Constitution of Multilayer Ceramic Capacitor)

A multilayer ceramic capacitor 1 as an example of an electronic component according to the present embodiment is shown in the FIGURE. The multilayer ceramic capacitor 1 has an element body 10 in which a dielectric layer 2 and an internal electrode layer 3 are stacked in alternating manner. At both ends of this element body 10, a pair of external electrodes 4 is formed which connects to each internal electrode 3 placed alternatingly in the element body 10. A shape of the element body 10 is not particularly limited, and usually it is rectangular parallelepiped shape. Also, a size of the element body 10 is not particularly limited, and it may be any appropriate size depending on the purpose of use.

(1.2 Dielectric Layer)

The dielectric layer 2 is constituted from a dielectric composition according to the present embodiment described in below. As a result, the multilayer ceramic capacitor having the dielectric layer 2 can exhibit a high resistivity (for example $1.0 \times 10^6$ Ωm or more) even when a main component of the internal electrode layer is base metals.

A thickness per one layer (thickness of a layer) of the dielectric layer 2 is not particularly limited, and it can be set to any thickness depending on desired properties and purpose of use. Usually, the dielectric layer thickness is preferably 100 µm or less and more preferably 30 µm or less. Also, the number of stacked dielectric layers is not particularly limited, and in the present embodiment, it is preferably 20 or more.

(1.3 Internal Electrode Layer)

In the present embodiment, the internal electrode layer 3 is stacked so that each end face is exposed alternatingly to two opposing end surfaces of the element body 10.

The main component of the conductive material included in the internal electrode layer 3 is base metals. As base metals, it is not particularly limited, and for example known base metals such as Ni, Ni-based alloy, Cu, Cu-based alloy, and the like may be used. Note that, various trace amount components such as P and the like may be included about 0.1 mass % or less in Ni, Ni-based alloy, Cu, or Cu-based alloy. Also, the internal electrode layer 3 may be formed using commercially available electrode paste. A thickness of the internal electrode layer 3 may be determined accordingly depending on the purpose of use.

(1.4 External Electrode)

A conductive material included in the external electrode 4 is not particularly limited. For example, known conductive materials such as Ni, Cu, Sn, Ag, Pd, Pt, Au, alloy of these, or conductive resins may be used. A thickness of the external electrode 4 may be determined accordingly depending on the purpose of use.

2. DIELECTRIC COMPOSITION

The dielectric composition according to the present embodiment includes a complex oxide including at least Ba, Zr, and Nb as a main component. That is, in the present embodiment, 80 mass % or more and preferably 90 mass % or more of the complex oxide is included in 100 mass % of the dielectric composition according to the present embodiment.

Also, the dielectric composition has main component grains constituted from the above mentioned complex oxide and grain boundaries existing between the main component grains. The grain boundaries includes oxides of aluminum (aluminum oxides) described in below, components diffused from the main component, and the like.

An average grain size of the main component grains is preferably within the range of 0.01 to 10 µm. Also, the average grain size of the main component grains is more preferably 0.1 µm or more. On the other hand, the average grain size of the main component grains is more preferably 1 µm or less. By having the average grain size of the main component grains within the above mentioned range, the dielectric composition having a high mechanical strength tends to be easily obtained.

In the present embodiment, the average grain size of the main component grains is an average value of a code diameter calculated from a code method. Specifically, an arbitrary straight line is drawn on a photograph with the main component grains in it and the length of the straight line is divided by the number of intersection points of the straight line and grain boundaries, thereby the code diameter is calculated. The code diameter is calculated for ten or so of the straight lines, and the average value thereof is determined as the average grain size of the main component grains.

(2.1 Complex Oxide)

Elements other than oxygen included in the complex oxide are separated into three element groups (that is into "A", "B", and "C") based on valence of the elements, and the complex oxide is represented by a general formula of $A_a B_b C_4 O_{15+\alpha}$.

"A" represents divalent elements and Ba is included. "B" represents tetravalent elements and Zr is included. "C" represents pentavalent elements and Nb is included. Also, "a" of the general formula represents a ratio of the number of "A" atoms when 4 atoms of elements constituting "C" are included, and "b" of the general formula represents a ratio of the number of "B" atoms when 4 atoms of elements constituting "C" are included in the general formula.

In the present embodiment, "a" is 3.05 or more and preferably 3.10 or more. An upper limit of "a" is not particularly limited as long as the effect of the present invention can be attained, however it is preferably 3.50 or less and more preferably 3.30 or less.

Also, in the present embodiment, "b" is 1.01 or more and preferably 1.05 or more. An upper limit of "b" is not particularly limited as long as the effect of the present invention can be attained; however it is preferably 1.50 or less and more preferably 1.30 or less.

Therefore, compared to the complex oxide of which a stoichiometric composition is represented by a general formula of $A_3 B_1 C_4 O_{15}$, the above mentioned complex oxide is a complex oxide which includes excessive amounts of "A" and "B" in a predetermined ratio with respect to "C". Compared to a ratio of "A", "B", and "C" in the general formula of $A_3 B_1 C_4 O_{15}$ (A:B:C=3:1:4), the complex oxide of the present embodiment includes excessive amount of "A" and "B" with respect to "C", thereby the above mentioned complex oxide of the present embodiment can exhibit a high resistivity even when it is fired under reduced atmosphere. As a result, the electronic component obtained by firing the dielectric composition, which is supposed to be an insulator, including the above mentioned complex oxide of the present embodiment at the same time with the electrode constituted from the base metals can sufficiently exhibit the dielectric properties.

On the other hand, when either or both of "a" and "b" are out of the above mentioned range, the resistivity of the complex oxide drastically decreases when it is fired under reduced atmosphere, and the resistivity becomes as low as a semiconductor or a conductor. As a result, the dielectric properties cannot be obtained.

Note that, in the complex oxide of the present embodiment, an amount of oxygen (O) may change depending on a constitution ratio of "A", "B", and "C"; oxygen defects; and the like. Thus, in the present embodiment, the amount of oxygen deviated from a stoichiometric ratio is represented by "α" compared to a stoichiometric ratio of the complex oxide represented by the general formula of $A_3B_1C_4O_{15}$. A range of "α" is not particularly limited, and for example it may be about −1 or more and 1 or less.

The complex oxide represented by the general formula of $A_3B_1C_4O_{15}$ is a relaxor ferrodielectric, "B" and "C" having different valances occupy predetermined sites of a crystal structure of the complex oxide in a predetermined ratio. Due to heterogeneity caused by local structure formed as mentioned in above, it is thought that the predetermined dielectric properties can be attained.

Following is speculated as an example of a reason which allows obtaining the complex oxide exhibiting a high resistivity even when the complex oxide according to the present embodiment is fired under reduced atmosphere. When the complex oxide represented by the general formula of $A_3B_1C_4O_{15}$ is fired, oxygen is taken from the complex oxide, and the oxygen defects and the free electrons are generated in a pair. As a result, conductivity is generated due to movements of the free electrons being generated, and it is thought that the resistivity of the complex oxide decreases.

Here, by having excessive amounts of "A" and "B" with respect to "C", this increases a ratio of "B" occupying sites where "B" and "C" are occupying. In other words, it can be considered that "B" substitutes "C". As mentioned in above, "B" is tetravalent elements and "C" is pentavalent elements, therefore when "B" substitutes "C", balance of valances against oxygen is broken and oxygen defects are generated, but free electrons are not generated. As a result, the complex oxide has oxygen defects to some extent, thus the reaction producing the oxygen defects during reduction firing becomes difficult to proceed. That is, the reaction which takes oxygen from the complex oxide becomes difficult to occur even under reduced atmosphere. Therefore, it becomes difficult to generate the free electrons, and the resistivity is thought to be suppressed from decreasing.

In the present embodiment, "A" at least includes Ba and divalent elements A1 may be included besides Ba. "A1" preferably includes one or more selected from the group consisting of Mg, Ca, and Sr. In addition to Ba, when "A1" is included in "A", the complex oxide of the present embodiment can be represented by $(Ba_{1-x}A1_x)_aB_bC_4O_{15+\alpha}$. In this formula, "x" is preferably 0.00 or more. On the other hand, "x" is preferably 0.50 or less, and more preferably 0.25 or less. The preferable dielectric properties can be obtained even when "A1" is included in "A".

Note that, when Mg is included as "A1", a specific permittivity tends to decrease. Therefore, from the point of obtaining a high specific permittivity, a ratio of the number of Mg atoms is preferably 0.20 or less and more preferably 0.10 or less when the total number of atoms constituting "A" is 1.

Also, "B" at least includes Zr and tetravalent elements $B_1$ may be included besides Zr. "B1" preferably includes one or more selected from the group consisting of Ti and Hf. When "B" includes "B1" in addition to Zr, the complex oxide according to the present embodiment can be represented by $A_a(Zr_{1-y}B_{1-y})_bC_4O_{15+\alpha}$. In the formula, "y" is preferably 0.00 or more. On the other hand, "y" is preferably 0.50 or less and more preferably 0.25 or less. The preferable dielectric properties can be obtained even when "B" includes "B1".

Note that, when Ti is included as "B1", a resistivity tends to decrease. Therefore, in the present embodiment, Ti is preferably included in a level which allows obtaining the effects of the present invention. Specifically, a ratio of the number of Ti atoms is preferably 0.25 or less and more preferably 0.125 or less when the total number of atoms constituting "B" is 1. From the point of obtaining a high resistivity, preferably Ti is substantially not included. Here, "Ti is substantially not included" means that Ti may be included as long as it is about an amount of inevitable impurity.

Also, "C" at least includes Nb and pentavalent elements C1 may be included besides Nb. Also, "C1" preferably includes Ta. When "C1" is included in "C" in addition to Nb, the composite oxide according to the present embodiment can be represented by a general formula of $A_aB_b(Nb_{1-z}C1_z)_4O_{15+\alpha}$. In this formula, "z" is preferably 0.00 or more. On the other hand, "z" is preferably 0.50 or less and more preferably 0.25 or less. The preferable dielectric properties can be obtained even when "C" includes "C1".

Note that, a ratio of the number of divalent element A1 atoms other than Mg, Ca, and Sr is preferably 0.10 or less when the total number of atoms constituting "A" is 1. A ratio of the number of tetravalent element B1 atoms other than Ti and Hf is preferably 0.10 or less when the total number of atoms constituting "B" is 1. A ratio of the number of pentavalent element C1 atoms other than Ta is preferably 0.10 or less when the total number of atoms constituting "C" is 1.

According to above, the general formula $A_aB_bC_4O_{15+\alpha}$ can be expressed as $(Ba_{1-x}A1_x)_a(Zr_{1-y}B_{1-y})_b(Nb_{1-z}C1_z)_4O_{15+\alpha}$. Here, "a", "b", "x", "y", "z", and "α" are within the above mentioned range.

(2.2 Oxides of Al (Aluminum Oxides))

The dielectric composition according to the present embodiment may include the oxide including aluminum (aluminum oxides) other than the above mentioned complex oxide. By having oxides of aluminum, the resistivity of the dielectric composition can be further improved and the dielectric properties can be improved. Further, by having oxides of aluminum, the average grain size of the main component grains constituted from the above mentioned complex oxide can be made small. As a result, the dielectric composition having a high mechanical strength tends to be obtained easily. As oxides of aluminum, for example $Al_2O_3$ (aluminum oxide) may be mentioned.

Oxides of aluminum mainly function as a sintering aid. That is, by having a raw material of oxides of aluminum in the raw material of the dielectric composition, sintering of the dielectric composition is facilitated during firing. Therefore, this allows lowering a firing temperature necessary to attain a sintering property which enables to exhibit sufficient properties. In other words, the density of the dielectric composition can be increased even when it is obtained by firing at the same temperature. In the present embodiment, the density of the dielectric composition is preferably 4.48 g/cm³ or more and more preferably 4.72 g/cm³ or more.

Also, the properties of the dielectric composition improve as the sintering property of the dielectric composition improves. Therefore, by having oxides of aluminum, good resistivity and other dielectric properties can be attained even when the sintering temperature is low.

In the present embodiment, a content of oxides of aluminum is preferably 0.5 mass % or more and more preferably 1 mass % or more with respect to 100 mass % of the above mentioned complex oxide. On the other hand, the content of oxides of aluminum is preferably 20 mass % or less and more preferably 10 mass % or less with respect to 100 mass % of the above mentioned complex oxide.

Also, oxides of aluminum preferably include Ba, and more preferably it is a complex oxide including Al (aluminum) and Ba (barium). As the complex oxide which includes Al (aluminum) and Ba (barium), preferably the number of Ba (barium) atoms is fewer than the number of Al (aluminum) atoms. As such complex oxide, for example $0.82BaO \cdot 6Al_2O_3$, $1.32BaO \cdot 6Al_2O_3$, and $BaAl_2O_4$ may be mentioned; and preferably it is $1.32BaO \cdot 6Al_2O_3$.

Also, the dielectric composition according to the present embodiment may include other component besides the above mentioned complex oxide and oxides of aluminum as long as the effects of the present invention can be exhibited. A content of other component is preferably 20 mass % or less and more preferably 10 mass % or less in 100 mass % of the dielectric composition. Particularly, a total content of one or more components selected from the group consisting of $SiO_2$, $MnO$, $CuO$, $Fe_2O_3$, and $Bi_2O_3$ is preferably 0.5 mass % or less in 100 mass % of the dielectric composition. Such component lowers the sintering property of the dielectric composition, and as a result, the dielectric property and physical property of the dielectric composition are also decreased.

3. METHOD OF PRODUCING MULTILAYER CERAMIC CAPACITOR

Next, an example of a method of producing the multilayer ceramic capacitor shown in the FIGURE is described in below.

The multilayer ceramic capacitor 1 according to the present embodiment can be produced by a same and known method for producing a conventional multilayer ceramic capacitor. As a known method, for example a method of producing the multilayer ceramic capacitor by forming and firing a green chip using a paste including a raw material of the dielectric composition may be mentioned as an example. Hereinafter, the method of producing the multilayer ceramic capacitor is described in detail.

First, a starting raw material of the dielectric composition is prepared. As the starting raw material, the complex oxide which constitutes the above mentioned dielectric composition can be used. Also, oxides of each metal included in the complex oxide can be used. Also, various compounds which become the components constituting the complex oxide by firing can be used. As various compounds, for example carbonates, oxalates, nitrates, hydroxides, organometallic compounds, and the like may be mentioned. Also, when the dielectric composition includes oxides of aluminum, a raw material of oxides of aluminum is also prepared. As similar to the raw material of the complex oxide, oxides, various compounds, and the like can be used as the raw material of oxides of aluminum. In the present embodiment, the above mentioned starting raw materials are preferably powder.

Among the prepared starting raw materials, the raw material of the complex oxide is weighed to satisfy predetermined ratio, and wet mixing is performed for a predetermined length of time using a ball mill and the like. After drying a mixed powder, a heat treatment is carried out in a temperature range of 700 to 1300° C. under air atmosphere, thereby a calcined powder of the complex oxide is obtained. Also, when oxides of aluminum is a complex oxide, the raw material of each component constituting the complex oxide is heat treated; thereby a calcined powder of oxides of aluminum is preferably obtained.

Next, a paste for producing a green chip is prepared. The obtained calcined powder, a binder, and a solvent are kneaded together to form a paste; thereby a dielectric layer paste is prepared. When the dielectric composition includes oxides of aluminum, a dielectric layer paste is prepared by forming a paste by kneading a calcined powder, a raw material powder of oxides of aluminum or a calcined powder of oxides of aluminum, a binder, and a solvent. As the binder and a solvent, any known binders and solvents may be used. Also, additives such as a plasticizer, a dispersant, and the like may be added to the dielectric layer paste if needed.

The internal electrode layer paste is obtained by kneading the above mentioned raw material of the conductive material, a binder, and a solvent. As the binder and the solvent, any known binders and solvents may be used. The internal electrode layer paste may include additives such as an inhibitor, a plasticizer, and the like if needed.

The external electrode paste can be prepared as same as the internal electrode layer paste.

Each paste obtained is used to form the green sheet and the internal electrode pattern, and these are stacked to obtain a green chip.

The obtained green chip is subjected to a binder removal treatment if necessary. A binder removal condition may be any known condition, and for example a holding temperature is preferably 200 to 350° C.

After the binder removal treatment, the green chip is fired to obtain an element body. In the present embodiment, the green chip can be fired under reduced atmosphere (reduction firing). Other firing condition may be any known condition, and for example a holding temperature is preferably 1200 to 1450° C.

After firing, the obtained element body is subjected to a re-oxidation treatment (annealing) if necessary. An annealing condition can be any known condition, and for example oxygen partial pressure during annealing is higher than oxygen partial pressure during firing, and a holding temperature is preferably 1150° C. or less.

The dielectric composition constituting the dielectric layer of the element body obtained as such is the dielectric composition mentioned in above. This element body is carried out with end face polishing, and the external electrode paste is coated and baked, thereby the external electrode 4 is formed. Then, if necessary, a coating layer is formed by plating and the like to the surface of the external electrode 4.

As such, the multilayer ceramic capacitor according to the present embodiment is produced.

4. EFFECTS IN THE PRESENT EMBODIMENT

The present embodiment uses the complex oxide having more "A" and "B" atoms than "C" atoms compared to a stoichiometric composition of the complex oxide represented by a general formula of $A_3B_1C_4O_{15}$.

As such, because the complex oxide simultaneously has more "A" and "B" atoms than "C" atoms, "C" is substituted by "B" having smaller valence than "C", and even though the oxygen defects are formed in the complex oxide, the free electrons are not formed.

By having such oxygen defects, usual reduction reaction in which the oxygen defects and the free electrons are formed in a pair becomes difficult to progress. As a result, the free electrons which are formed along with reduction reaction are suppressed from increasing and the resistivity caused by movements of the free electrons is suppressed from decreasing. As a result, the dielectric composition obtained by reduction firing can exhibit a high resistivity.

In order to attain such effects, Ba constituting "A" may be substituted by divalent elements "A1" in a predetermined ratio; Zr constituting "B" may be substituted by tetravalent elements "B1" in a predetermined ratio; and Nb constituting "C" may be substituted by pentavalent elements "C1" in a predetermined ratio.

Further, the dielectric composition includes oxides of aluminum in addition to the complex oxide, thereby a sintering property improves. Hence, compared to the case of not including oxides of aluminum, the dielectric composition sufficiently sinters even when the firing temperature is low. In other words, at a same firing temperature, a density of the dielectric composition after firing improves and also the dielectric properties improves in addition to the resistivity. Also, since the dielectric composition includes oxides of aluminum, the average size of the main component grains can be made small. As a result, a high mechanical strength is easily attained.

5. MODIFIED EXAMPLES

In the above mentioned embodiment, the multilayer ceramic capacitor is described as an electronic component according to the present embodiment, but the electronic component according to the present embodiment is not limited to the multilayer ceramic capacitor, and it may be any electronic component as long as it includes the dielectric composition mentioned in above.

Hereinabove, the embodiment of the present invention has been described, however the present invention is not to be limited thereto, and various modifications may be carried out within the scope of the present invention.

EXAMPLES

Hereinafter, the present invention is described in further details based on examples and comparative examples. However, the present invention is not to be limited thereto.

Experiment 1

First, powders of barium carbonate ($BaCO_3$), calcium carbonate ($CaCO_3$), strontium carbonate ($SrCO_3$), magnesium oxide (MgO), zirconium oxide ($ZrO_2$), hafnium oxide ($HfO_2$), titanium oxide ($TiO_2$), niobium oxide ($Nb_2O_5$), and tantalum oxide ($Ta_2O_5$) were prepared as starting raw materials of a complex oxide as a main component of a dielectric composition. The prepared starting raw materials were weighed so that the fired dielectric composition satisfied the composition shown in Table 1.

Next, the weighed powders were wet mixed for 16 hours by a ball mill using ion exchange water as a dispersant, then a mixture was dried; thereby the mixed raw material powder was obtained. Then, the obtained mixed raw material powder was heat treated under the condition of a holding time of 2 hours at a holding temperature of 900° C. in air atmosphere; thereby a calcined powder of complex oxide was obtained.

The obtained calcined powder was wet pulverized for 16 hours by a ball mill using ion exchange water as a dispersant, and a pulverized material was dried.

To 100 mass % of the pulverized calcined powder, 10 mass % of an aqueous solution including 6 mass % of polyvinyl alcohol resin as a binder was added for granulation, thereby a granulated powder was obtained.

The obtained granulated powder was put in a ϕ12 mm metal mold, and pre-press molding was performed at pressure of 0.6 ton/cm$^2$, then press molding was performed at pressure of 1.2 ton/cm$^2$, thereby a green molded article of circular disk shape was obtained.

The obtained green molded article was fired under reduced atmosphere, and further carried out with an annealing treatment; thereby a sintered body was obtained which was fired under reduced atmosphere. A firing condition was a temperature rising rate of 200° C./h, a holding temperature of 1375° C., and a holding time of 2 hours. An atmospheric gas was a mixed gas (hydrogen concentration 3%) of nitrogen and hydrogen which was humidified to have a dew point at 20° C. Also, an annealing treatment condition was a holding temperature of 1050° C. and a holding time of 2 hours. An atmospheric gas was a nitrogen gas which was humidified to have a dew point at 20° C.

To both of the main faces of the obtained sintered body, In—Ga alloy was coated to form a pair of electrodes; thereby a sample of ceramic capacitor of circular disk shape was obtained.

A digital resistance meter (R8340 made by ADVANTEST) was used to a capacitor sample, and an insulation resistance was measured at standard temperature (25° C.). The obtained insulation resistance, an effective electrode area, and a thickness of the dielectric layer were used to calculate a resistivity. The higher the resistivity was, the more preferable it was, and in the present examples, the resistivity of $1.0 \times 10^6$ (Ω·m) or more was considered good. The results are shown in Table 1.

Note that, it is obvious that a sample having the resistivity of less than $1.0 \times 10^4$ (Ω·m) does not attain sufficient dielectric properties. Thus, a specific permittivity and tan δ described in below were not measured.

To a sample having a resistivity of $1.0 \times 10^4$ (Ω·m) or more, a frequency of 1 kHz and an input signal level (measuring voltage) of 1 Vrms were input using a digital LCR meter (4284A made by YHP) at room temperature (20° C.), thereby a capacitance and tan δ were measured. Then, a specific permittivity (no unit) was calculated based on a thickness of the dielectric layer and a capacitance obtained from the measurement. The higher the specific permittivity was, the more preferable it was, and in the present examples, the sample having a specific permittivity of 100 or more was considered good. Results are shown in Table 1.

Note that, a specific permittivity of a sample having a resistivity of $1.0 \times 10^4$ (Ω·m) or more and less than $1.0 \times 10^8$ (Ω·m) was calculated based on the capacitance measured at a frequency of 1 MHz. A measured value of the capacitance of the sample measured at a frequency of 1 kHz was strongly influenced by the low resistance of the sample and had a low reliability. Similarly, tan δ of a sample having a resistivity of $1.0 \times 10^4$ (Ω·m) or more and less than $1.0 \times 10^8$ (Ω·m) was measured at a frequency of 1 MHz.

TABLE 1

| Sample No. | Complex oxide $(Ba_{1.00-x}A1_x)_a(Zr_{1.00-y}B1_y)_b(Nb_{1.00-z}C1_z)_4O_{15+\alpha}$ | | | | | Properties | | | |
|---|---|---|---|---|---|---|---|---|---|
| | a | b | x | y | z | Resistivity [Ωm] | Specific permittivity | tan δ [%] | Measured frequency |
| 1 | 2.88 | 0.72 | 0.00 | 0.00 | 0.00 | 9.7E+01 | — | — | — |
| 2 | 2.88 | 1.00 | 0.00 | 0.00 | 0.00 | 1.5E+02 | — | — | — |
| 3 | 2.88 | 1.28 | 0.00 | 0.00 | 0.00 | 8.0E+01 | — | — | — |
| 4 | 3.00 | 0.72 | 0.00 | 0.00 | 0.00 | 4.2E+01 | — | — | — |
| 5 | 3.00 | 1.00 | 0.00 | 0.00 | 0.00 | 3.1E+02 | — | — | — |
| 6 | 3.00 | 1.28 | 0.00 | 0.00 | 0.00 | 9.3E+01 | — | — | — |
| 7 | 3.12 | 0.72 | 0.00 | 0.00 | 0.00 | 2.9E+01 | — | — | — |
| 8 | 3.12 | 1.00 | 0.00 | 0.00 | 0.00 | 6.9E+02 | — | — | — |
| 9 | 3.12 | 1.28 | 0.00 | 0.00 | 0.00 | 1.5E+10 | 483 | 0.7% | 1 kHz |
| 10 | 3.20 | 1.00 | 0.00 | 0.00 | 0.00 | 9.3E+03 | — | — | — |
| 11 | 3.30 | 1.00 | 0.00 | 0.00 | 0.00 | 5.3E+05 | 784 | 43.6% | 1 MHz |
| 12 | 3.00 | 1.10 | 0.00 | 0.00 | 0.00 | 3.7E+02 | — | — | — |
| 13 | 3.10 | 1.10 | 0.00 | 0.00 | 0.00 | 3.2E+11 | 481 | 0.7% | 1 kHz |
| 14 | 3.20 | 1.10 | 0.00 | 0.00 | 0.00 | 6.9E+10 | 429 | 3.9% | 1 kHz |
| 15 | 3.30 | 1.10 | 0.00 | 0.00 | 0.00 | 1.9E+10 | 387 | 8.5% | 1 kHz |
| 16 | 3.00 | 1.20 | 0.00 | 0.00 | 0.00 | 8.5E+00 | — | — | — |
| 17 | 3.10 | 1.20 | 0.00 | 0.00 | 0.00 | 2.1E+12 | 371 | 0.1% | 1 kHz |
| 18 | 3.20 | 1.20 | 0.00 | 0.00 | 0.00 | 4.9E+11 | 301 | 0.2% | 1 kHz |
| 19 | 3.30 | 1.20 | 0.00 | 0.00 | 0.00 | 2.7E+11 | 289 | 0.7% | 1 kHz |
| 20 | 3.00 | 1.30 | 0.00 | 0.00 | 0.00 | 2.3E+03 | — | — | — |
| 21 | 3.10 | 1.30 | 0.00 | 0.00 | 0.00 | 1.4E+12 | 387 | 0.1% | 1 kHz |
| 22 | 3.20 | 1.30 | 0.00 | 0.00 | 0.00 | 4.0E+12 | 274 | 0.4% | 1 kHz |
| 23 | 3.30 | 1.30 | 0.00 | 0.00 | 0.00 | 1.9E+11 | 297 | 2.4% | 1 kHz |
| 24 | 3.01 | 1.01 | 0.00 | 0.00 | 0.00 | 4.9E−01 | — | — | — |
| 25 | 3.05 | 1.01 | 0.00 | 0.00 | 0.00 | 7.7E+06 | 887 | 35.7% | 1 MHz |
| 26 | 3.10 | 1.01 | 0.00 | 0.00 | 0.00 | 1.9E+07 | 764 | 21.4% | 1 MHz |
| 27 | 3.01 | 1.05 | 0.00 | 0.00 | 0.00 | 3.3E−01 | — | — | — |
| 28 | 3.05 | 1.05 | 0.00 | 0.00 | 0.00 | 9.3E+06 | 768 | 42.2% | 1 MHz |
| 29 | 3.10 | 1.05 | 0.00 | 0.00 | 0.00 | 1.3E+11 | 519 | 0.5% | 1 kHz |
| 30 | 3.01 | 1.10 | 0.00 | 0.00 | 0.00 | 1.8E+00 | — | — | — |
| 31 | 3.05 | 1.10 | 0.00 | 0.00 | 0.00 | 7.7E+06 | 840 | 56.7% | 1 MHz |
| 32 | 3.10 | 1.10 | 0.00 | 0.00 | 0.00 | 2.0E+12 | 463 | 0.2% | 1 kHz |

"aE + b" shown in the column of Resistivity indicates "a × $10^b$"

According to Table 1, compared to the stoichiometric composition of the complex oxide expressed by a compositional formula of $Ba_3ZrNb_4O_{15}$, a high resistivity was confirmed in a sample having ratios of the number of Ba and Zr atoms within the above mentioned range with respect to a the number of Nb atoms.

On the other hand, when ratios of the number of Ba and Zr atoms were out of the above mentioned range with respect to the number of Nb atoms, such sample had an extremely low resistivity.

Experiment 2

A capacitor sample was produced by the same method as Experiment 1 except for weighing starting raw materials so that a fired dielectric composition satisfied the composition shown in Table 2. Also, to the produced capacitor sample, the same evaluations as Experiment 1 were carried out. Results are shown in Table 2.

TABLE 2

| Sample No. | Complex oxide $(Ba_{1.00-x}A1_x)_a(Zr_{1.00-y}B1_y)_b(Nb_{1.00-z}C1_z)_4O_{15+\alpha}$ | | | | | | | | Properties | | |
|---|---|---|---|---|---|---|---|---|---|---|---|
| | a | A1 Element | x | b | B1 Element | y | C1 Element | z | Resistivity [Ωm] | Specific permittivity | tan δ [%] |
| 9 | 3.12 | — | 0.00 | 1.28 | — | 0.00 | — | 0.00 | 1.5E+10 | 483 | 0.7% |
| 33 | 3.12 | Mg | 0.25 | 1.28 | — | 0.00 | — | 0.00 | 4.5E+11 | 79 | 0.1% |
| 34 | 3.12 | Mg | 0.50 | 1.28 | — | 0.00 | — | 0.00 | 1.0E+06 | 30 | 5.8% |
| 35 | 3.12 | Mg | 0.75 | 1.28 | — | 0.00 | — | 0.00 | 1.7E+05 | 27 | 18.2% |
| 36 | 3.12 | Ca | 0.25 | 1.28 | — | 0.00 | — | 0.00 | 1.1E+12 | 383 | 0.1% |
| 37 | 3.12 | Ca | 0.75 | 1.28 | — | 0.00 | — | 0.00 | 1.6E+01 | — | — |
| 38 | 3.12 | Sr | 0.25 | 1.28 | — | 0.00 | — | 0.00 | 1.2E+12 | 401 | 0.1% |
| 39 | 3.12 | Sr | 0.50 | 1.28 | — | 0.00 | — | 0.00 | 5.2E+09 | 525 | 2.4% |
| 40 | 3.12 | — | 0.00 | 1.28 | Ti | 0.0625 | — | 0.00 | 1.0E+08 | 369 | 10.1% |
| 41 | 3.12 | — | 0.00 | 1.28 | Ti | 0.125 | — | 0.00 | 1.4E+08 | 352 | 10.1% |
| 42 | 3.12 | — | 0.00 | 1.28 | Ti | 0.25 | — | 0.00 | 7.2E+07 | 335 | 12.9% |
| 43 | 3.12 | — | 0.00 | 1.28 | Ti | 0.50 | — | 0.00 | 8.1E+04 | . | .. |
| 44 | 3.12 | — | 0.00 | 1.28 | Hf | 0.50 | — | 0.00 | 8.6E+11 | 415 | 0.1% |

TABLE 2-continued

| | Complex oxide $(Ba_{1.00-x}A1_x)_a(Zr_{1.00-y}B1_y)_b(Nb_{1.00-z}C1_z)_4O_{15+\alpha}$ | | | | | | | Properties | | |
|---|---|---|---|---|---|---|---|---|---|---|
| Sample | | A1 | | | B1 | | C1 | Resistivity | Specific | tan δ |
| No. | a | Element | x | b | Element | y | Element | z | [Ωm] | permittivity | [%] |
| 45 | 3.12 | — | 0.00 | 1.28 | — | 0.00 | Ta | 0.25 | 1.1E+10 | 256 | 0.1% |
| 46 | 3.12 | — | 0.00 | 1.28 | — | 0.00 | Ta | 0.50 | 1.4E+08 | 177 | 0.3% |
| 47 | 3.12 | — | 0.00 | 1.28 | — | 0.00 | Ta | 0.75 | 5.0E+05 | 61 | 0.0% |

"aE + b" shown in the column of Resistivty indicates "a × 10$^b$"

According to Table 2, by substituting Ba, Zr, and Nb with the above mentioned elements in a ratio mentioned in above, it was confirmed that a high resistivity can be obtained. Also, when the ratio of the number of atoms of substituting elements exceeded the above mentioned range, the resistivity decreased. Particularly, when a ratio of the number of Mg atoms was too large, it was confirmed that the resistivity and the specific permittivity both decreased.

Experiment 3

As starting raw materials of oxides of aluminum, powders of aluminum oxide ($Al_2O_3$) and barium carbonate ($BaCO_3$) were prepared. Also, as starting raw materials of oxides of aluminum of the comparative examples, powders of silicon oxide ($SiO_2$), manganese oxide (MnO), copper oxide (CuO), iron oxide ($Fe_2O_3$), and bismuth oxide ($Bi_2O_3$) were prepared.

The prepared starting raw materials were weighed so that the fired dielectric composition satisfied the composition shown in Table 3. Oxides of aluminum and $SiO_2$ and the like were weighed so that 5 mass % of these were included with respect to 100 mass % of the complex oxide. Note that, the composition of the complex oxide was the same as the composition of Sample No. 9 of Experiment 1.

The capacitor samples were produced by the same method as Experiment 1 except for changing the firing temperature to 1300° C. Also, the produced capacitor sample was subjected to the same evaluations as Experiment 1, and furthermore a density, an average grain size, and a mechanical strength were evaluated. Results are shown in Table 3.

The density was measured as described in below. A diameter of the fired capacitor sample having a circular disk shape was measured at three different places, thereby a diameter R was obtained. Next, the thickness of the capacitor sample having a circular disk shape was measured at three different places; thereby a thickness h was obtained. Using the obtained R and h, a volume V (=¼·π·R²·h) of the capacitor sample having a circular disk shape was calculated. Here, it is a ratio of a circle's circumference. Next, a mass m of the capacitor sample having a circular disk shape was measured, and by calculating m/V, the density of the capacitor sample having a circular disk shape was obtained. An average of the results of the density evaluated for three samples are shown in Table 3.

The average grain size was measured as described in below. The surface of the obtained sintered body was mirror polished and thermal etching was carried out in air at a temperature rising rate of 200° C./h and a holding temperature of 1200° C. for a holding time of 2 hours. The surface of the sintered body was observed by SEM after thermal etching, then the main component grains were identified and a code diameter of the main component grains was measured.

Arbitrary lines were drawn on the photograph of the surface of the sintered body taken by SEM, and the number of grain boundaries crossing the lines was counted. Then, by dividing a length of line with the number of grain boundaries, the code diameter was calculated. Ten lines were drawn, and the code diameter was measured for each of the lines. The average value of the measured code diameters was defined as the average grain size of the main component grains. The average grain size is shown in Table 3.

The mechanical strength of the dielectric composition was measured as described in below. The obtained granulated powder was put in a metal mold having a size of 5×53 mm, then pre-press molding was performed at pressure of 0.6 ton/cm². Then, press molding was performed at pressure of 1.2 ton/cm²; thereby a green molded article was produced. The obtained green molded article was fired under reduced atmosphere, and an annealing treatment was further performed, then firing was performed under reduced atmosphere, thereby a column shaped sintered body was obtained. A cross section of the sintered body was parallelepiped shape. A firing condition was a temperature rising rate of 200° C./h, a holding temperature of 1300° C., and a holding time of 2 hours. The atmospheric gas was a mixed gas of nitrogen and hydrogen which was humidified to have a dew point at 20° C. (hydrogen concentration of 3%). Also, annealing condition was a holding temperature of 1050° C. and a holding time of 2 hours. The atmospheric gas was a nitrogen gas which was humidified to have a dew point at 20° C.

The obtained sintered body was processed into a size of a total length of 36 mm or more and less than 45 mm, width of 4.0+0.1 mm, and thickness of 3.0+0.1 mm, and chamfering was performed to obtain a test sample. To ten of the test samples obtained from each sample, a three-point bending test was performed based on a testing method according to JIS R 1601. In the present examples, a sample having an average value of three-point bending test of 40 MPa or more was considered extremely good (◉), a sample having 30 MPa or more was considered good (○), an a sample having less than 30 MPa was considered poor (x). The results are shown in Table 3.

TABLE 3

| Sample No. | Complex oxide $(Ba_{1.00-x}A1_x)_a(Zr_{1.00-y}B1_y)_b(Nb_{1.00-z}C1_z)_4O_{15+\alpha}$ | | | | | | Properties | | | | | |
|---|---|---|---|---|---|---|---|---|---|---|---|---|
| | a | b | x | y | z | Aluminum oxides | Resistivity [Ωm] | Specific permittivity | tan δ [%] | Density [g/cm³] | Ave. particle size [μm] | Three-point bending strength evaluation |
| 48 | 3.12 | 1.28 | 0.00 | 0.00 | 0.00 | None | 1.7E+08 | 137 | 0.8% | 3.76 | 4.0 | ○ |
| 49 | 3.12 | 1.28 | 0.00 | 0.00 | 0.00 | $Al_2O_3$ | 4.0E+09 | 235 | 1.6% | 4.48 | 0.6 | ⊚ |
| 50 | 3.12 | 1.28 | 0.00 | 0.00 | 0.00 | $0.82BaO\cdot6Al_2O_3$ | 1.1E+11 | 356 | 0.2% | 4.72 | 0.5 | ⊚ |
| 51 | 3.12 | 1.28 | 0.00 | 0.00 | 0.00 | $1.32BaO\cdot6Al_2O_3$ | 2.7E+11 | 277 | 0.1% | 5.04 | 0.4 | ⊚ |
| 52 | 3.12 | 1.28 | 0.00 | 0.00 | 0.00 | $BaAl_2O_4$ | 2.6E+11 | 409 | 0.2% | 4.95 | 0.5 | ⊚ |
| 53 | 3.12 | 1.28 | 0.00 | 0.00 | 0.00 | MnO | 1.1E+08 | 163 | 2.3% | 3.89 | 11 | X |
| 54 | 3.12 | 1.28 | 0.00 | 0.00 | 0.00 | $SiO_2$ | 2.0E+07 | 153 | 3.1% | 3.83 | 30 | X |
| 55 | 3.12 | 1.28 | 0.00 | 0.00 | 0.00 | $Fe_2O_3$ | 1.2E+07 | 122 | 3.5% | 3.65 | 41 | X |
| 56 | 3.12 | 1.28 | 0.00 | 0.00 | 0.00 | CuO | 1.0E+08 | 122 | 2.8% | 3.65 | 12 | X |
| 57 | 3.12 | 1.28 | 0.00 | 0.00 | 0.00 | $Bi_2O_3$ | 7.0E+07 | 166 | 1.5% | 3.91 | 52 | X |

"aE + b" shown in the column of Resistivity indicates "a × $10^b$"

According to Table 3, it was confirmed that the dielectric composition having oxides of aluminum had an improved sintering property and a higher density compared to the sample which did not include oxides of aluminum. As a result, improved resistivity, specific permittivity, and three-point bending strength were confirmed. In Experiment 3, firing was performed at a lower firing temperature (1300° C.) compared to the firing temperature (1375° C.) of Experiment 1, but because the dielectric composition included oxides of aluminum, the resistivity and the specific permittivity were about the same or better than Experiment 1.

Also, it was confirmed that the complex oxide of A1 and Ba was preferable as oxides of aluminum compared to $Al_2O_3$.

On the other hand, it was confirmed that the samples including $SiO_2$, MnO, CuO, $Fe_2O_3$, or $Bi_2O_3$ which is widely used as a sintering aid had poor resistivity, specific permittivity, density, and three-point bending strength compared to the sample including oxides of aluminum.

In the present embodiment, the resistivity of a so-called single layer ceramic capacitor was evaluated, but the multilayer ceramic capacitor in which the dielectric layer and the internal electrode are stacked exhibits a similar resistivity as the capacitor sample of the present examples.

NUMERICAL REFERENCES

1 . . . Multilayer ceramic capacitor
10 . . . Element body
2 . . . Dielectric layer
3 . . . Internal electrode layer
4 . . . External electrode

What is claimed is:

1. A dielectric composition including a complex oxide represented by a formula of $A_aB_bC_4O_{15+\alpha}$ as a main component, in which
"A" at least includes Ba, "B" at least includes Zr, "C" at least includes Nb, "a" is 3.05 or more, and "b" is 1.01 or more.

2. The dielectric composition according to claim 1, wherein
the formula is represented by $(Ba_{1-x}A1_x)_a(Zr_{1-y}B1_y)_b$ $(Nb_{1-z}C1_z)_4O_{15+\alpha}$, in which
"A1" includes one or more selected from the group consisting of Mg, Ca, and Sr,
"B1" includes one or more selected from the group consisting of Ti and Hf,
"C1" includes Ta,
"x" is 0.50 or less, "y" is 0.25 or less, and "z" is 0.50 or less.

3. The dielectric composition according to claim 1, wherein "a" is 3.10 or more.

4. The dielectric composition according to claim 2, wherein "a" is 3.10 or more.

5. The dielectric composition according to claim 1, wherein "b" is 1.05 or more.

6. The dielectric composition according to claim 2, wherein "b" is 1.05 or more.

7. The dielectric composition according to claim 1, wherein the dielectric composition includes an oxide including aluminum.

8. The dielectric composition according to claim 2, wherein the dielectric composition includes an oxide including aluminum.

9. The dielectric composition according to claim 7, wherein the oxide including aluminum is a complex oxide including Ba.

10. The dielectric composition according to claim 8, wherein the oxide including aluminum is a complex oxide including Ba.

11. The dielectric composition according to claim 1, wherein a density is 4.48 g/cm³ or more.

12. An electronic component comprising a dielectric layer including the dielectric composition according to claim 1 and an electrode layer including a base metal as a main component.

* * * * *